United States Patent [19]

Hamauchi

[11] Patent Number: 5,257,269
[45] Date of Patent: Oct. 26, 1993

[54] ERROR CONTROLLER FOR USE IN DEBUGGING MICROPROCESSOR

[75] Inventor: Tetsuji Hamauchi, Tokyo, Japan
[73] Assignee: NEC Corporation, Tokyo, Japan
[21] Appl. No.: 622,245
[22] Filed: Dec. 4, 1990
[30] Foreign Application Priority Data Dec. 4, 1989 [JP] Japan ................... 1-315794

[51] Int. Cl.⁵ ................................ G06F 11/00
[52] U.S. Cl. ............................ 371/29.5; 371/19; 395/575
[58] Field of Search ............ 371/29.5, 29.1, 19; 364/267.91; 395/575

[56] References Cited

U.S. PATENT DOCUMENTS

| | | | |
|---|---|---|---|
| 4,514,845 | 4/1985 | Starr | 371/15 |
| 4,819,234 | 4/1989 | Huber | 371/19 |
| 4,881,228 | 10/1989 | Shouda | 371/19 |

Primary Examiner—Robert W. Beausoliel, Jr.
Assistant Examiner—Ly V. Hua
Attorney, Agent, or Firm—Whitham & Marhoefer

[57] ABSTRACT

An error controller for use in a debugging microprocessor includes a bus error detection circuit for generating an exception request signal when an external bus error signal is supplied through an external input terminal and an exception control circuit responding to the exception request signal so as to control an exception processing. A double bus error detection circuit receives the external bus error signal for stopping an operation of a microprocessor when the external bus error signal is detected in the way of the exception processing. A bus error status saving circuit is provided for controlling the bus error detection circuit so as to save, when an interrupt request is given through a debug interrupt request terminal, a bus error status held in the bus error detection circuit indicating that the exception processing for the bus error is being executed when the interrupt request is given, so that the bus error detection circuit is brought into a condition of no bus error. The bus error status saving circuit operates to return the saved bus error status to the bus error detection circuit at the time of returning from the interrupt.

4 Claims, 3 Drawing Sheets

ERROR CONTROLLER FOR USE IN DEBUGGING MICROPROCESSOR

BACKGROUND OF THE INVENTION

1. Field of the Invention

The present invention relates to an error controller for use in a debugging microprocessor having an external bus error detection function and a debug interrupt terminal.

2. Description of Related Art

Conventional microprocessors include microprocessors of the type provided with input terminals used for informing the microprocessor of an error in an external circuit. As one of the input terminals, a bus error input terminal for notifying a data transfer error in a data bus has been known.

In ordinary cases, when an error signal is inputted through the bus error terminal, a microprocessor causes an exception to occur, and branches into a bus error processing routine, so that a bus error processing is executed in a software manner. An address where the bus error has occurred is stored in a stack, and then, supplied to the bus error processing routine. In this case, if a bus error occurs again in the way of the bus error processing, the condition is judged to be irreversible or irrevocable, and therefore, the microprocessor is caused to stop the operation.

One typical example of conventional bus error controllers for use in a debugging microprocessor includes a bus error detecting circuit for sampling a bus error signal supplied through an external terminal at each bus cycle. When the bus error signal is detected, the bus error detecting circuit outputs an exception generation request signal, to an exception control circuit, and at the same time, activates a bus error status signal. In response to the exception generation request signal, the exception control circuit causes an exception to occur, so that the microprocessor branches into a bus error processing routine by saving a return address, PSW (program status word), an address of a bus error occurrence, and an exception code into a stack. When the bus error processing has been completed and the microprocessor returns from the bus error processing routine, the exception control circuit generates an active exception return signal to the bus error detection circuit in order to notify the completion of the bus error processing. In response to this active exception return signal, the bus error detection circuit inactivates the bus error status signal.

In addition, there is provided a double error detection circuit for monitoring the bus error status signal from the bus error detection circuit and the external bus error signal supplied through the external input terminal, and for stopping the operation of the debugging microprocessor when a bus error occurs again in the way of the bus error processing.

In the above mentioned conventional debugging microprocessor, an ordinary interrupt is inhibited after generation of the exception until completion of the exception processing.

In many cases, the above mentioned conventional debugging microprocessor has been incorporated in an in-circuit emulator. The in-circuit emulator has a function of stopping or breaking execution of a user program (break function) so that the control is moved to a monitor program by inputting a break request to a debug interrupt input terminal of the debugging microprocessor from an external circuit. This function is very effective in knowing and changing values in registers of the microprocessor at a desired time point. Since the debug interrupt is given the highest priority so as to be able to break at any arbitrary address, the break request is acknowledged or accepted even if the microprocessor is in the way of the exception processing.

In the conventional debugging microprocessor, therefore, it can be expected that a debug interrupt is requested or accepted in the way of a bus error processing routine performed after a bus error had occurred in the process of execution of a user program. This circumstance would easily occur in the case that a break point is set at a head of the bus error processing routine so that when a bus error occurs at any address a break is performed. When the debug interrupt is accepted, the control of the debugging microprocessor goes into the monitor program of the in-circuit emulator. However, since no relation exists between the bus error processing and the debug interrupt, the monitor program is executed as an extension of the bus error processing routine.

For example, in order to confirm an address of bus error occurrence, when a command is applied to cause to indicate the address of bus error occurrence, there will occur a bus error for the monitor program to access to the address of bus error occurrence. Since this bus error occurs before the microprocessor returns from the bus error processing routine, this bus error is regarded as a double bus error (a second bus error occurring in the way of the bus error processing), so that the operation of the microprocessor is stopped. As a result, the control cannot be moved into a bus error processing routine of the monitor program. Namely, a further debugging operation becomes impossible.

SUMMARY OF THE INVENTION

Accordingly, it is an object of the present invention to provide a bus error controller for use in a debugging microprocessor, which has overcome the above mentioned defect of the conventional one.

Another object of the present invention is to provide a bus error controller for use in a debugging microprocessor, which makes it possible to start an interrupt processing without a bus error, regardless of whether or not the bus error processing is being performed before the control moves into the interrupt processing, so that even if a bus error occurs again in the way of the interrupt processing, the operation of the debugging microprocessor will never be stopped.

The above and other objects of the present invention are achieved in accordance with the present invention by an error controller for use in a debugging microprocessor, the error controller including a bus error detection means for receiving an external bus error signal supplied through an external input terminal and for generating an exception request signal when the external bus error signal is detected, an exception control means responding to the exception request signal so as to control an exception processing, and a double bus error detection means receiving the external bus error signal for stopping an operation of a microprocessor when the external bus error signal is detected in the way of the exception processing, wherein the improvement comprises a bus error status saving means for controlling the bus error detection means so as to saving, when an interrupt request is given through a debug interrupt request terminal, a bus error status held in the bus error detection means indicating that the exception processing for the bus error is being executed when the interrupt request is given, so that the bus error detection means is brought into a condition of no bus error, the bus error status saving means operating to return the saved bus error status to the bus error detection means at the time of returning from the interrupt.

With the above mentioned arrangement, even if an interrupt processing is requested in the way of the bus error processing, the interrupt processing can be started under a condition in which no history of bus error is held. Therefore, even if a bus error occurs in the way of the interrupt processing, the operation of the debugging microprocessor will never be stopped. Namely, a bus error processing routine can be caused to be included in the interrupt processing routine. Accordingly, if the bus error controller is incorporated in an in-circuit emulator, a bus error generated in the way of execution of a monitor program executed as the interrupt processing routine can be processed by the bus error processing routine in the monitor program.

The above and other objects, features and advantages of the present invention will be apparent from the following description of preferred embodiments of the invention with reference to the accompanying drawings.

DESCRIPTION OF THE PREFERRED EMBODIMENTS

Figure 1:
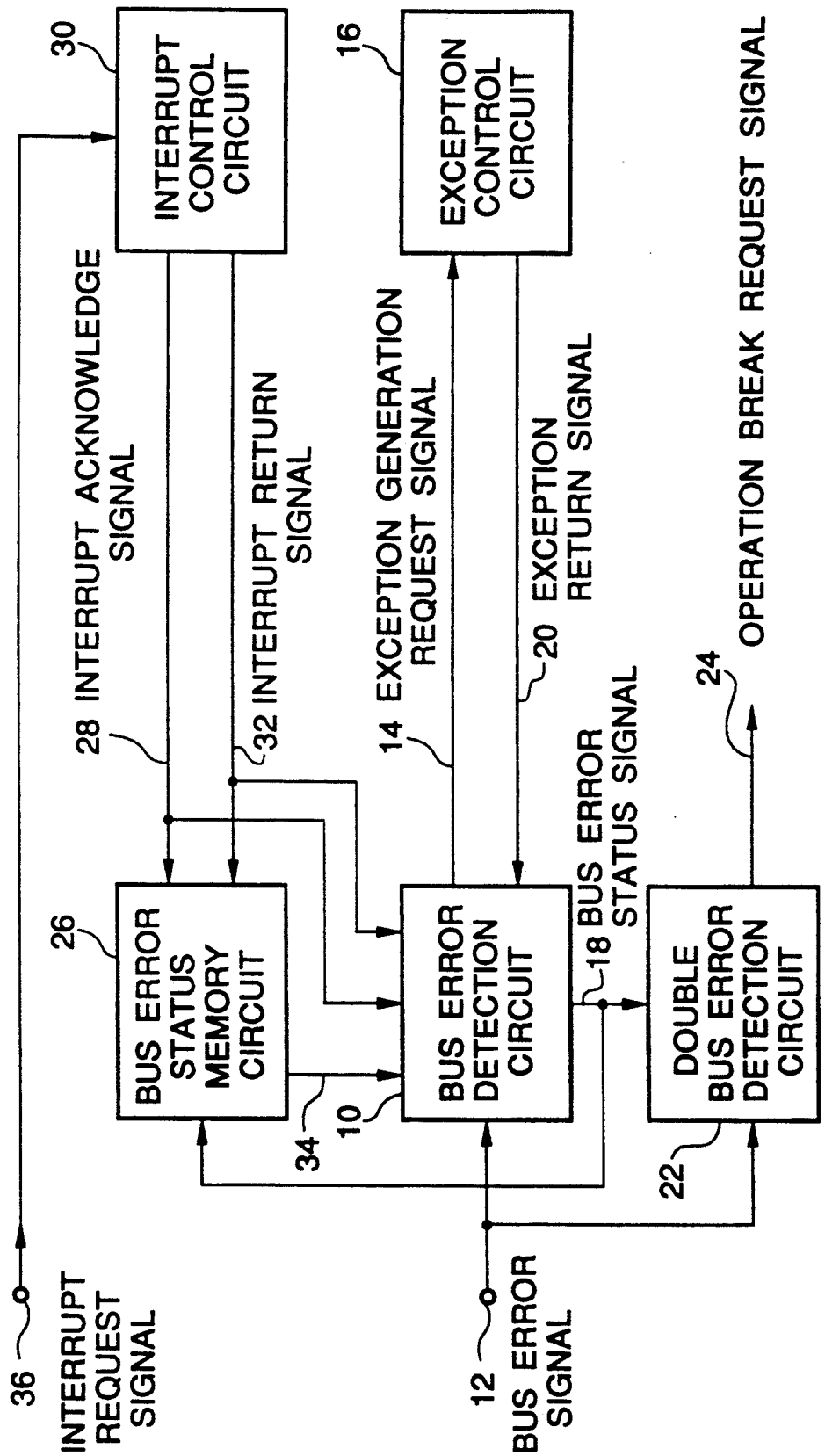
FIG. 1 is a block diagram of one embodiment of the error controller in accordance with the present invention for use in a debugging microprocessor.

Referring to FIG. 1, there is shown a block diagram of one embodiment of the error controller in accordance with the present invention for use in a debugging microprocessor. The shown error controller is included in the debugging microprocessor, but the other portions of the debugging microprocessor, which does not directly relate to the gist of the present invention, are omitted for simplification of the drawing.

The shown bus error controller for use in a debugging microprocessor includes a bus error detecting circuit 10 for sampling at each bus cycle a bus error signal 12 supplied through an external terminal. When an active bus error signal 12 is detected, the bus error detecting circuit 10 generates an exception generation request signal 14 to an exception control circuit 16, and at the same time, activates a bus error status signal 18. In response to the exception generation request signal 14, the exception control circuit 16 generates an exception, so that a microprocessor branches into a bus error processing routine by saving a return address, PSW (program status word), an address of a bus error occurrence, and an exception code into a stack (not shown). When the bus error processing has been completed and the microprocessor returns from the bus error processing routine, the exception control circuit 16 generates an active exception return signal 20 to the bus error detection circuit 10 in order to notify the completion of the bus error processing. In response to this active exception return signal 20, the bus error detection circuit 10 inactivates the bus error status signal 18.

The shown bus error controller also includes a double error detection circuit 22 for monitoring the bus error status signal 18 from the bus error detection circuit and the external bus error signal 12 supplied through an external input terminal. Namely, when the bus error status signal 18 is active, if the external bus error signal 12 is detected, the double error detection circuit 22 generates an operation break request signal 24 so that the operation of the microprocessor is stopped.

In addition, the shown bus error controller includes a bus error status memory circuit 26 connected to receive the bus error status signal 18 from the bus error detection circuit 10 and an interrupt acknowledge signal 28 from an interrupt control circuit 30, and operating to temporarily hold the bus error status signal 18 in response to the interrupt acknowledge signal 28 from the interrupt control circuit 30. When the interrupt processing has been completed, the interrupt control circuit 30 generates an interrupt return signal 32, and in response to the interrupt return signal 32, the bus error status memory circuit 26 outputs a saved status signal 34 indicative of the bus error status signal 18 temporarily held in the bus error status memory circuit 26.

The interrupt acknowledge signal 28 is also supplied to the bus error detection circuit 10 so as to clear the bus error status signal 18, so that a condition of no bus error is created. The interrupt return signal 32 is also supplied to the bus error detection circuit 10 so as to cause the bus error detection circuit 10 to receive the saved status signal 34 and to revive or regenerate the bus error status signal having the same content as that of the saved status signal 34 (namely, the bus error status signal saved when the interrupt processing is started).

The interrupt control circuit 30 is connected to receive an interrupt request signal 36 and generates the interrupt in response to the interrupt request signal 36. At a head of the interrupt processing, the interrupt control circuit 30 activates the interrupt acknowledge signal 28. Then, when a return instruction is executed at an end of the interrupt processing routine, the interrupt control circuit 30 activates the interrupt return signal 32, so that the interrupt processing is terminated.

Figure 2:
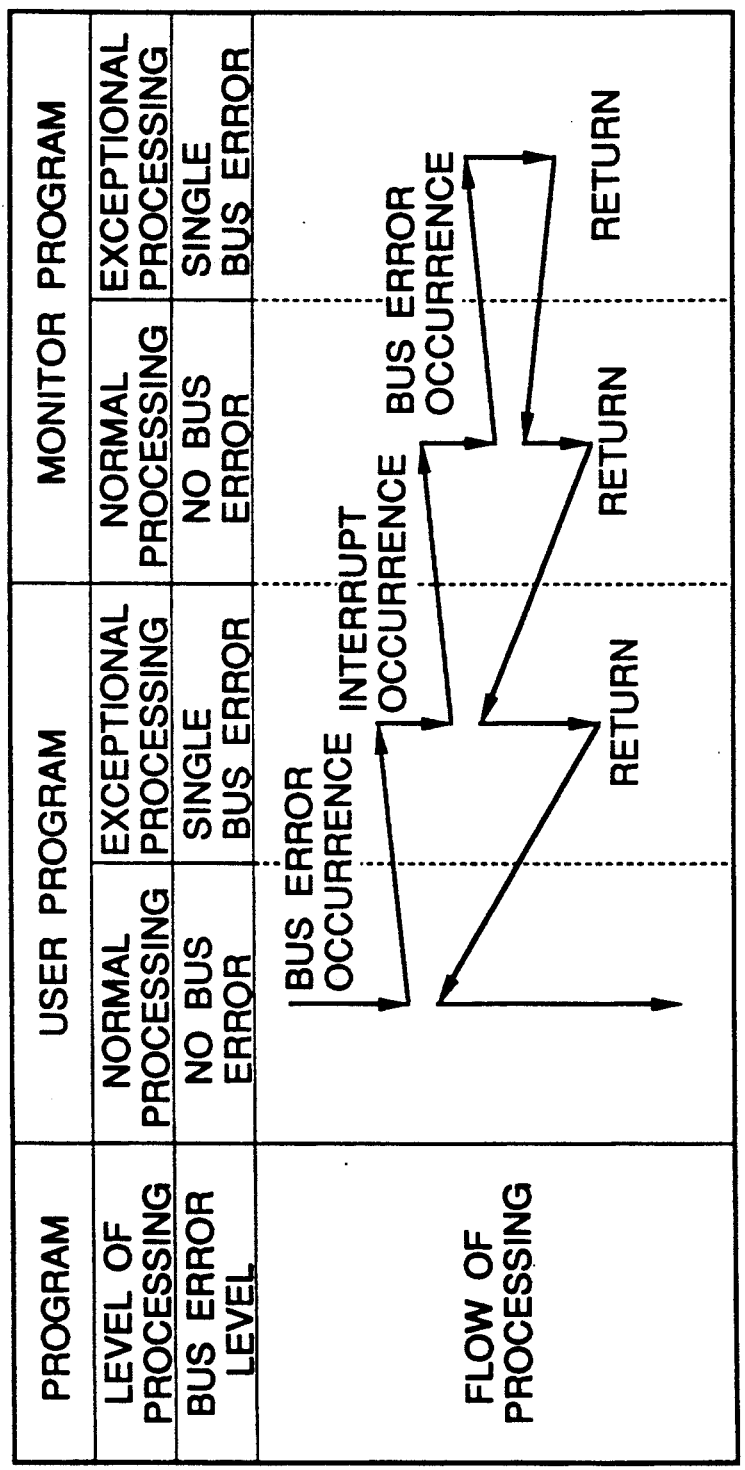
FIG. 2 shows a flow of processing in the debugging microprocessor controlled by the error controller shown in FIG. 1.

Referring to FIG. 2, there is shown a flow of processing in the case that the error controller shown in FIG. 1 is incorporated in the in-circuit emulator. Similarly to the situation explained hereinbefore in connection with the conventional error controller, consider a situation in which a debug interrupt is requested in the way of execution of a bus error processing routine performed after a bus error had occurred in the process of execution of a user program.

When the debug interrupt is acknowledged or accepted, the bus error status signal 18 indicating that a condition just before the debug interrupt is a single bus error status, is saved to the bus error status memory circuit 26. In response to the interrupt acknowledge signal 28 outputted at the head of the interrupt processing, the bus error detection signal clears the bus error status signal 18. As a result, regardless of the condition of the bus error just before the debug interrupt, execution of the monitor program is started under a condition in which no bus error exists.

Therefore, if a bus error occurs in the process of execution of the monitor program, the control moves into a bus error processing routine included in the monitor program.

In the bus error processing routine of the monitor program, a bus error occurs only when anomaly exists in the monitor program itself or in the hardware of the in-circuit emulator. In other words, a bus error does not ordinarily occur in the bus error processing routine.

When a return instruction of the monitor program is executed and the control is returned to the user program, the interrupt return signal 32 is activated, and in response to the active interrupt return signal 32, the saved or held bus error status signal is returned in the form of the saved status signal 34 from the bus error status memory circuit 26 to the bus error detection circuit 10.

As seen from the above, even if a bus error occurs in the monitor program, the control can move into the bus error processing routine of the monitor program. Therefore, even if a double bus error occurs, the operation of the debugging microprocessor is not stopped.

Figure 3:
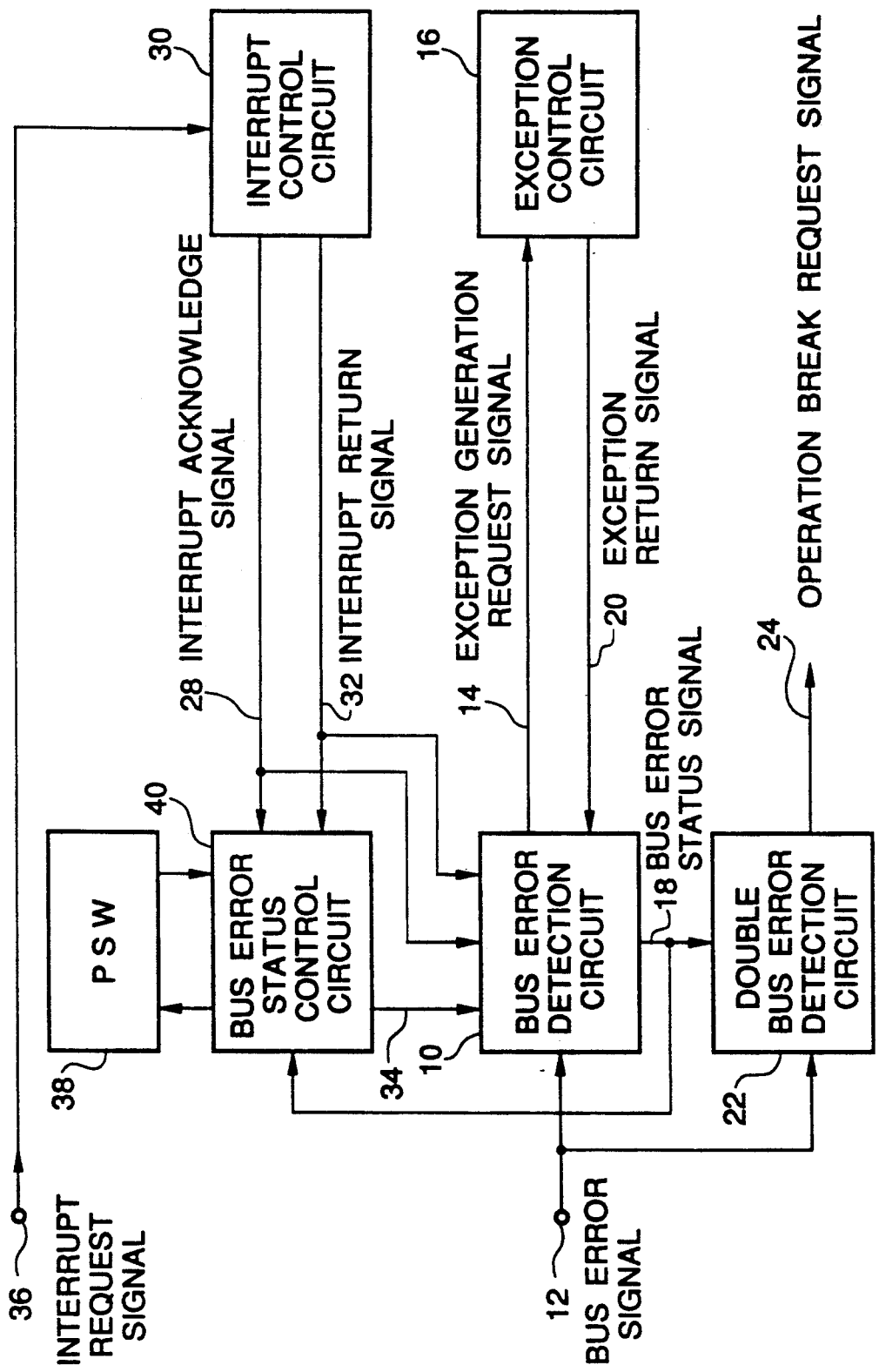
FIG. 3 is a block diagram of another embodiment of the error controller in accordance with the present invention for use in a debugging microprocessor.

Referring to FIG. 3, there is shown a block diagram of another embodiment of the error controller in accordance with the present invention for use in a debugging microprocessor. In FIG. 3, elements similar to those shown in FIG. 1 are given the same Reference Numerals, and explanation thereof will be omitted.

As seen from comparison between FIGS. 1 and 3, the second embodiment includes a PSW (program status word) circuit 38 and a bus error status control circuit 40 in place of the bus error status memory circuit 26 in the first embodiment.

An operation of the second embodiment is the same as that of the first embodiment, excepting the following points: In the first embodiment, the bus error status memory circuit 26 is realized by an internal memory of the debugging microprocessor so that the bus error status is saved in the internal memory of the debugging microprocessor. However, in the second embodiment, the bus error status is saved in a main memory external to the debugging microprocessor. Namely, the bus error status control circuit 40 assigns a bus error status to a bit of the PSW circuit 38. Therefore, the bus error status signal 18 can be read by reading out the PSW circuit 38, and can be modified by writing into the PSW circuit 38.

When the debug interrupt is performed, the microprocessor operates, at the head of the interrupt processing, to save a return address, a PSW, an address of bus error occurrence, and an exceptional code to a stack provided in an external memory. At this time, the bus error status signal 18 is read out as a bit of the PSW circuit 38 and saved to the stack. On the other hand, when the control is returned from the debug interrupt, the return address and the content of the PSW are returned to a program counter and the PSW circuit 38, respectively. At this time, the status before the debug interrupt is written to the PSW circuit 38, and at the same time, returned to the bus error detection circuit 10.

In the first embodiment, since the bus error status is saved in the internal memory, it is not possible to modify the saved bus error status. Therefore, when the bus error processing routine is broken, if attempt is made to modify the return address on the stack and to execute another routine, it becomes a single bus error status when it returns to the user program. On the other hand, in the second embodiment, since the bus error status before the break is stored in the PSW circuit 38 saved in the stack, it is possible to modify the bus error status. Therefore, it is possible to return to the bus error status made consistent with the level of the bus error of a routine which is started for execution.

The invention has thus been shown and described with reference to the specific embodiments. However, it should be noted that the present invention is in no way limited to the details of the illustrated structures but changes and modifications may be made within the scope of the appended claims.

I claim:

1. An error controller for use in a debugging microprocessor comprising:
    an external input terminal for receiving a bus error signal and a debug interrupt request terminal for receiving an interrupt request signal;
    bus error detection means connected to said external input terminal for receiving a bus error signal and for generating a bus error status signal and an exception request signal when said bus error signal is detected;
    exception control means connected to said bus error detection means for receiving said exception request signal and controlling an exception processing in said microprocessor;
    interrupt control means connected to said debug interrupt request terminal for receiving an interrupt request signal and generating an interrupt acknowledge signal when said debug interrupt request signal is received and generating an interrupt return signal when at an end of an interrupt processing routine;
    bus error status saving means connected to said bus error detection means and responsive to said interrupt acknowledge signal for saving said bus error status signal, said bus error detection means also being connected to said interrupt control means and responsive to said interrupt acknowledge signal for clearing said bus error status signal and responsive to said interrupt return signal for restoring said bus error status signal to said bus error detection circuit; and
    double bus error detection means connected to said external input terminal for receiving said bus error signal and to said bus error detection means for receiving said bus error status signal, said double bus error detection means stopping an operation of said microprocessor when an external bus error signal is detected at a time when said bus error status signal is present.

2. An error controller claimed in claim 1 wherein said bus error status saving means includes an internal memory of said debugging microprocessor.

3. An error controller claimed in claim 1 wherein said bus error status saving means includes:
    means for temporarily holding a program status word representing said bus error status saved from said bus error detection means and for returning said held bus error status to said bus error detection means, and
    a bus error status control means connected to said means for temporarily holding a program status word for writing said saved bus error status to said means for temporarily holding a program status word and reading out said saved bus error status from said means for temporarily holding a program status word.

4. An error controller claimed in claim 3 wherein said means for temporarily holding a program status word is an external memory allowing the bus error status represented by a program status word saved in said external memory to be modified.

* * * * *